United States Patent
Cui et al.

(10) Patent No.: US 12,309,884 B2
(45) Date of Patent: May 20, 2025

(54) INDICATION OF SIMULTANEOUS RX BEAMS CAPABILITY AND RELATED MEASUREMENT RESOURCE COORDINATION

(71) Applicant: APPLE INC., Cupertino, CA (US)

(72) Inventors: Jie Cui, San Jose, CA (US); Dawei Zhang, Saratoga, CA (US); Haitong Sun, Cupertino, CA (US); Hong He, San Jose, CA (US); Huaning Niu, San Jose, CA (US); Manasa Raghavan, Sunnyvale, CA (US); Qiming Li, Beijing (CN); Xiang Chen, Campbell, CA (US); Yang Tang, San Jose, CA (US); Yushu Zhang, Beijing (CN)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/905,289

(22) PCT Filed: Sep. 24, 2021

(86) PCT No.: PCT/CN2021/120174
§ 371 (c)(1),
(2) Date: Aug. 30, 2022

(87) PCT Pub. No.: WO2023/044717
PCT Pub. Date: Mar. 30, 2023

(65) Prior Publication Data
US 2024/0196197 A1  Jun. 13, 2024

(51) Int. Cl.
*H04W 8/22* (2009.01)
*H04W 16/28* (2009.01)
(Continued)

(52) U.S. Cl.
CPC ............. *H04W 8/22* (2013.01); *H04W 16/28* (2013.01); *H04W 24/10* (2013.01); *H04W 76/15* (2018.02)

(58) Field of Classification Search
CPC ....... H04W 8/22; H04W 76/15; H04W 16/28; H04W 24/10
See application file for complete search history.

(56) References Cited

U.S. PATENT DOCUMENTS 10,812,239 B2 * 10/2020 Gao .................. H04B 7/088
11,310,015 B2 * 4/2022 Cha .................. H04L 5/005
(Continued)

FOREIGN PATENT DOCUMENTS

CN 110226301 A 9/2019

OTHER PUBLICATIONS

Ericsson, "On TCI state updates for L1/L2 centric inter-cell mobility", R4-2110974, 3GPP TSG RAN WG4 Meeting #99-e, Electronic Meeting, Agenda Item 9.18.2, May 19-27, 2021, 4 pages.
(Continued)

Primary Examiner — Bailor C Hsu
(74) Attorney, Agent, or Firm — Dorsey & Whitney LLP

(57) ABSTRACT

The present disclosure is related to indication of simultaneous RX beams capability and related measurement resource coordination. In an embodiment, a UE is configured to receive, from a base station, a measurement configuration comprising a measurement period for performing measurements on one or more carriers. The UE is further configured to assign measurement resources to the one or more carriers based on a simultaneous RX beams capability, wherein the measurement resources comprise searchers and RX beams during each measurement occasion. The UE is further configured to determine a measurement period scaling factor for the one or more carriers based on the assigned resources.
(Continued)

With this capability, the UE can complete L1 and/or L3 measurements and transmit a measurement report to the base station earlier.

20 Claims, 9 Drawing Sheets

(51) Int. Cl.
*H04W 24/10* (2009.01)
*H04W 76/15* (2018.01)

(56) References Cited

U.S. PATENT DOCUMENTS

| | | | |
|---|---|---|---|
| 2016/0269919 A1* | 9/2016 | Kazmi | H04W 36/0094 |
| 2020/0120525 A1 | 4/2020 | Da Silva | |
| 2020/0196327 A1 | 6/2020 | Zhang et al. | |
| 2020/0229008 A1* | 7/2020 | Islam | H04W 80/02 |
| 2022/0086740 A1* | 3/2022 | Li | H04B 7/0695 |
| 2022/0295300 A1* | 9/2022 | Takada | H04W 72/046 |
| 2022/0295301 A1* | 9/2022 | Takada | H04B 7/088 |
| 2023/0224734 A1* | 7/2023 | Cui | H04W 24/08 370/252 |
| 2024/0340667 A1* | 10/2024 | Liu | H04W 76/27 |

OTHER PUBLICATIONS

PCT/CN2021/120174, International Search Report and Written Opinion, Apr. 2, 2022, 6 pages.

ZTE, "Enhancements on multi-beam operation", R1-1904014, 3GPP TSG RAN WG1 Meeting #96bis, Xi'an, China, Agenda Item 7.2.8.3, Apr. 8-12, 2019, 17 pages.

* cited by examiner

| | | | | | | | | |
|---|---|---|---|---|---|---|---|---|
| PCC | RX beam 1 & 2 | RX beam 3 & 4 | RX beam 5 & 6 | RX beam 7 & 8 | RX beam 1 & 2 | RX beam 3 & 4 | RX beam 5 & 6 | RX beam 7 & 8 |
| SCC 1 | RX beam 1 & 2 | | RX beam 3 & 4 | | RX beam 5 & 6 | | RX beam 7 & 8 | |
| SCC 2 | | RX beam 1 & 2 | | RX beam 3 & 4 | | RX beam 5 & 6 | | RX beam 7 & 8 |

FIG. 6A

| | | | | | | | | |
|---|---|---|---|---|---|---|---|---|
| PCC | RX beam 1 to 4 | RX beam 5 to 8 | | | RX beam 1 to 4 | RX beam 5 to 8 | | |
| SCC 1 | | | RX beam 1 & 2 | RX beam 3 & 4 | RX beam 5 & 6 | RX beam 7 & 8 | | |
| SCC 2 | | | RX beam 1 & 2 | RX beam 3 & 4 | RX beam 5 & 6 | RX beam 7 & 8 | | |

| | | | | | | | | |
|---|---|---|---|---|---|---|---|---|
| PCC | RX beam 1 & 2 | RX beam 3 & 4 | RX beam 5 & 6 | RX beam 7 & 8 | RX beam 1 & 2 | RX beam 3 & 4 | RX beam 5 & 6 | RX beam 7 & 8 |
| SCC 1 | RX beam 1 & 2 | | RX beam 3 & 4 | | RX beam 5 & 6 | | RX beam 7 & 8 | |
| SCC 2 | | RX beam 1 & 2 | | RX beam 3 & 4 | | RX beam 5 & 6 | | RX beam 7 & 8 |

FIG. 7B

| | | | | | | | | |
|---|---|---|---|---|---|---|---|---|
| PCC | RX beam 1 to 4 | RX beam 5 to 8 | | | | | RX beam 1 to 4 | RX beam 5 to 8 |
| SCC 1 | | | RX beam 1 & 2 | RX beam 3 & 4 | RX beam 5 & 6 | RX beam 7 & 8 | | |
| SCC 2 | | | RX beam 1 & 2 | RX beam 3 & 4 | RX beam 5 & 6 | RX beam 7 & 8 | | |

| | | | | | | | | |
|---|---|---|---|---|---|---|---|---|
| PCC | RX beam 1 & 2 | RX beam 3 & 4 | RX beam 5 & 6 | RX beam 7 & 8 | RX beam 1 & 2 | RX beam 3 & 4 | RX beam 5 & 6 | RX beam 7 & 8 |
| SCC 1 | | RX beam 1 & 2 | | RX beam 3 & 4 | | RX beam 5 & 6 | | RX beam 7 & 8 |
| SCC 2 | RX beam 1 & 2 | | RX beam 3 & 4 | | RX beam 5 & 6 | | RX beam 7 & 8 | |

FIG. 8A

| | | | | | | | | |
|---|---|---|---|---|---|---|---|---|
| PCC | RX beam 1& 2& 3 | RX beam 4& 5& 6 | RX beam 7& 8& 1 | RX beam 2& 3& 4 | RX beam 5& 6& 7 | RX beam 8& 1& 2 | RX beam 3& 4& 5 | RX beam 6& 7& 8 |
| SCC 1 | RX beam 1& 2& 3 | | RX beam 4& 5& 6 | | RX beam 7& 8& 1 | | RX beam 2& 3& 4 | |
| SCC 2 | | RX beam 4& 5& 6 | | RX beam 7& 8& 1 | | RX beam 2& 3& 4 | | RX beam 5& 6& 7 |

FIG. 8B

| L3 measurement on CC1 | Rough RX beam 1&2 | Rough RX beam 3&4 | Rough RX beam 5&6 | Rough RX beam 7&8 | Rough RX beam 1&2 | Rough RX beam 3&4 | Rough RX beam 5&6 | Rough RX beam 7&8 |
|---|---|---|---|---|---|---|---|---|
| L1 measurement on CC1 | Fine RX beam 1 | Fine RX beam 2 | Fine RX beam 3 | Fine RX beam 4 | Fine RX beam 5 | Fine RX beam 6 | Fine RX beam 7 | Fine RX beam 8 |

FIG. 9A

| L3 measurement on CC1 | Rough RX beam 1&2&3 | Rough RX beam 4&5&6 | Rough RX beam 7&8&1 | Rough RX beam 2&3&4 | | Rough RX beam 5&6&7 | Rough RX beam 8&1&2 | |
|---|---|---|---|---|---|---|---|---|
| L1 measurement on CC1 | | | Fine RX beam 1&2&3 | | Fine RX beam 4&5&6 | | | |

FIG. 9B

INDICATION OF SIMULTANEOUS RX BEAMS CAPABILITY AND RELATED MEASUREMENT RESOURCE COORDINATION

TECHNICAL FIELD

This application relates generally to wireless communication systems and methods, including indications of simultaneous receiving (RX) beam capability for a wireless communication device and mechanisms for measurement resource coordination.

BACKGROUND

Wireless mobile communication technology uses various standards and protocols to transmit data between a base station and a wireless communication device. Wireless communication system standards and protocols can include, for example, 3rd Generation Partnership Project (3GPP) long term evolution (LTE) (e.g., 4G), 3GPP new radio (NR) (e.g., 5G), and IEEE 802.11 standard for wireless local area networks (WLAN) (commonly known to industry groups as Wi-Fi®).

As contemplated by the 3GPP, different wireless communication systems standards and protocols can use various radio access networks (RANs) for communicating between a base station of the RAN (which may also sometimes be referred to generally as a RAN node, a network node, or simply a node) and a wireless communication device known as a user equipment (UE). 3GPP RANs can include, for example, global system for mobile communications (GSM), enhanced data rates for GSM evolution (EDGE) RAN (GERAN), Universal Terrestrial Radio Access Network (UTRAN), Evolved Universal Terrestrial Radio Access Network (E-UTRAN), and/or Next-Generation Radio Access Network (NG-RAN).

Each RAN may use one or more radio access technologies (RATs) to perform communication between the base station and the UE. For example, the GERAN implements GSM and/or EDGE RAT, the UTRAN implements universal mobile telecommunication system (UMTS) RAT or other 3GPP RAT, the E-UTRAN implements LTE RAT (sometimes simply referred to as LTE), and NG-RAN implements NR RAT (sometimes referred to herein as 5G RAT, 5G NR RAT, or simply NR). In certain deployments, the E-UTRAN may also implement NR RAT. In certain deployments, NG-RAN may also implement LTE RAT.

A base station used by a RAN may correspond to that RAN. One example of an E-UTRAN base station is an Evolved Universal Terrestrial Radio Access Network (E-UTRAN) Node B (also commonly denoted as evolved Node B, enhanced Node B, eNodeB, or eNB). One example of an NG-RAN base station is a next generation Node B (also sometimes referred to as a g Node B or gNB).

A RAN provides its communication services with external entities through its connection to a core network (CN). For example, E-UTRAN may utilize an Evolved Packet Core (EPC), while NG-RAN may utilize a 5G Core Network (5GC).

Frequency bands for 5G NR may be separated into two or more different frequency ranges. For example, Frequency Range 1 (FR1) may include frequency bands operating in sub-6 GHz frequencies, some of which are bands that may be used by previous standards, and may potentially be extended to cover new spectrum offerings from 410 MHz to 7125 MHz. Frequency Range 2 (FR2) may include frequency bands from 24.25 GHz to 52.6 GHz. Bands in the millimeter wave (mm Wave) range of FR2 may have smaller coverage but potentially higher available bandwidth than bands in the FR1. Skilled persons will recognize these frequency ranges, which are provided by way of example, may change from time to time or from region to region.

SUMMARY

Some exemplary embodiments are related to a user equipment device (UE) having one or more antennas, a transceiver, and a processor. The one or more antennas are configured to perform wireless communications. The transceiver is coupled to the one or more antennas, and the processor is coupled to the transceiver and configured to cause the UE to perform operations for L3 and/or L1 measurements. The operations include receiving, from a base station, a measurement configuration comprising a measurement period for performing measurements on one or more carriers. The operations include determining a simultaneous receiving (RX) beams capability of the UE, wherein the simultaneous RX beams capability indicates whether the UE can support multiple RX beams for L3 or L1 measurements on a single carrier and a beam number of the multiple RX beams supported by the UE. The operations further include, based on the simultaneous RX beams capability, assigning measurement resources to the one or more carriers, wherein the measurement resources comprise searchers and RX beams during each measurement occasion. The operations further include, based on the assigned resources, determining a measurement period scaling factor for the one or more carriers.

Other exemplary embodiments are related to a method for operating a UE. The method includes operations for L3 and/or L1 measurements by the UE. The operations include receiving, from a base station, a measurement configuration comprising a measurement period for performing measurements on one or more carriers. The operations include determining a simultaneous RX beams capability of the UE, wherein the simultaneous RX beams capability indicates whether the UE can support multiple RX beams for L3 or L1 measurements on a single carrier and a beam number of the multiple RX beams supported by the UE. The operations further include, based on the simultaneous RX beams capability, assigning measurement resources to the one or more carriers, wherein the measurement resources comprise searchers and RX beams during each measurement occasion. The operations further include, based on the assigned resources, determining a measurement period scaling factor for the one or more carriers.

Further exemplary embodiments are related to an apparatus for operating a UE. The apparatus includes a processor configured to cause the UE to perform operations of the method described herein.

Further exemplary embodiments are related to a non-transitory computer-readable memory medium storing program instructions which, when executed by a computer system, cause implementation of operations of the method described herein.

Still further exemplary embodiments are related to a computer program product including program instructions which, when executed by a computer, cause implementation of operations of the method described herein.

These and other objects, features and advantages of the exemplary embodiments of the present disclosure will become apparent upon reading the following detailed description of the exemplary embodiments of the present disclosure.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIGS. 6A-9B illustrate examples of measurement resource assignment, according to embodiments disclosed herein.

DETAILED DESCRIPTION

Various embodiments are described with regard to a UE. However, reference to a UE is merely provided for illustrative purposes. The example embodiments may be utilized with any electronic component that may establish a connection to a network and is configured with the hardware, software, and/or firmware to exchange information and data with the network. Therefore, the UE as described herein is used to represent any appropriate electronic component.

Figure 1:
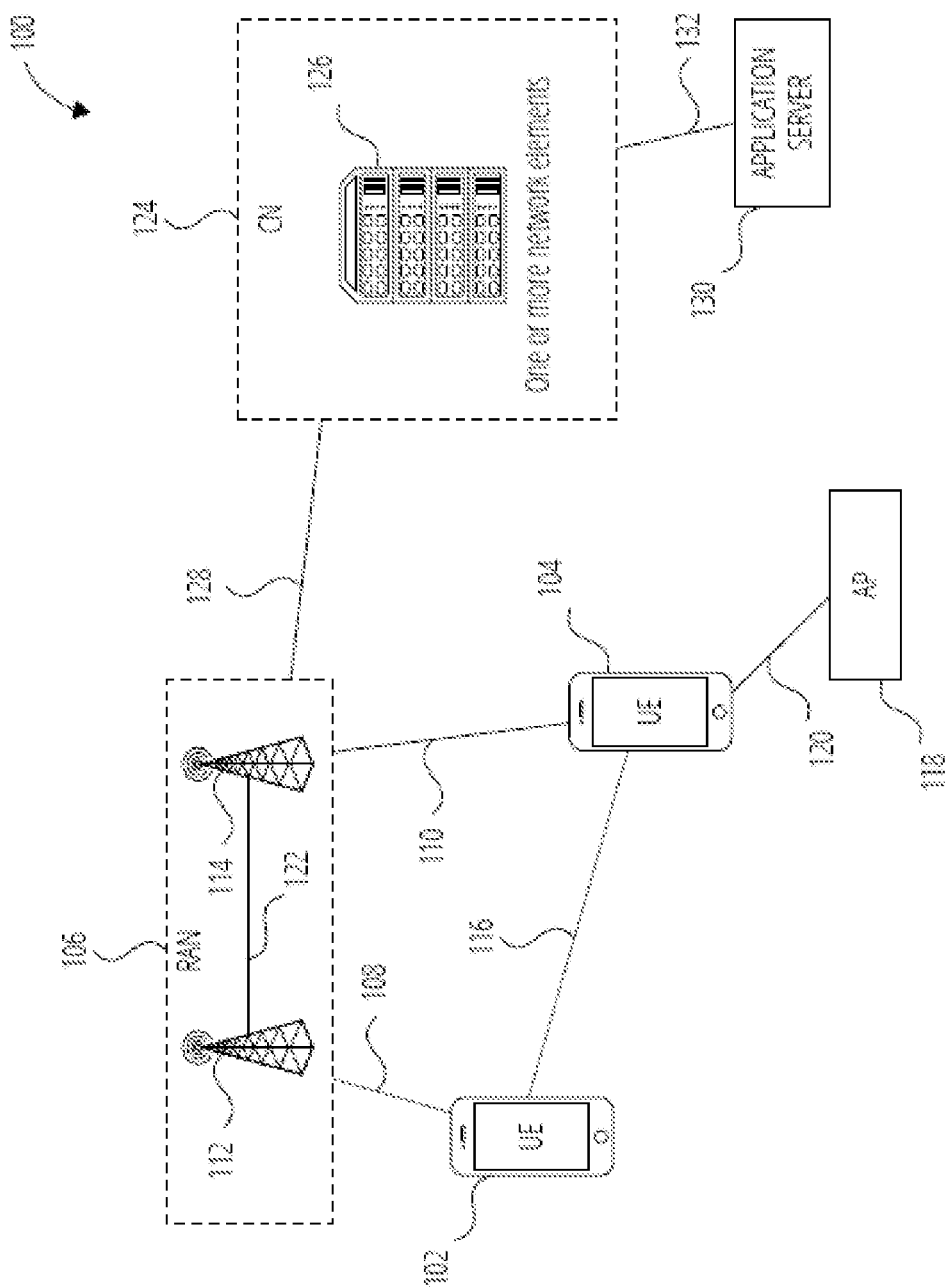
FIG. 1 illustrates an example architecture of a wireless communication system, according to embodiments disclosed herein.

FIG. 1 illustrates an example architecture of a wireless communication system 100, according to embodiments disclosed herein. The following description is provided for an example wireless communication system 100 that operates in conjunction with the LTE system standards and/or 5G or NR system standards as provided by 3GPP technical specifications.

As shown by FIG. 1, the wireless communication system 100 includes UE 102 and UE 104 (although any number of UEs may be used). In this example, the UE 102 and the UE 104 are illustrated as smartphones (e.g., handheld touchscreen mobile computing devices connectable to one or more cellular networks), but may also comprise any mobile or non-mobile computing device configured for wireless communication.

The UE 102 and UE 104 may be configured to communicatively couple with a RAN 106. In embodiments, the RAN 106 may be NG-RAN, E-UTRAN, etc. The UE 102 and UE 104 utilize connections (or channels) (shown as connection 108 and connection 110, respectively) with the RAN 106, each of which comprises a physical communications interface. The RAN 106 can include one or more base stations, such as base station 112 and base station 114, that enable the connection 108 and connection 110.

In this example, the connection 108 and connection 110 are air interfaces to enable such communicative coupling, and may be consistent with RAT(s) used by the RAN 106, such as, for example, an LTE and/or NR.

In some embodiments, the UE 102 and UE 104 may also directly exchange communication data via a sidelink interface 116. The UE 104 is shown to be configured to access an access point (shown as AP 118) via connection 120. By way of example, the connection 120 can comprise a local wireless connection, such as a connection consistent with any IEEE 802.11 protocol, wherein the AP 118 may comprise a Wi-Fi® router. In this example, the AP 118 may be connected to another network (for example, the Internet) without going through a CN 124.

In embodiments, the UE 102 and UE 104 can be configured to communicate using orthogonal frequency division multiplexing (OFDM) communication signals with each other or with the base station 112 and/or the base station 114 over a multicarrier communication channel in accordance with various communication techniques, such as, but not limited to, an orthogonal frequency division multiple access (OFDMA) communication technique (e.g., for downlink communications) or a single carrier frequency division multiple access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, all or parts of the base station 112 or base station 114 may be implemented as one or more software entities running on server computers as part of a virtual network. In addition, or in other embodiments, the base station 112 or base station 114 may be configured to communicate with one another via interface 122. In embodiments where the wireless communication system 100 is an LTE system (e.g., when the CN 124 is an EPC), the interface 122 may be an X2 interface. The X2 interface may be defined between two or more base stations (e.g., two or more eNBs and the like) that connect to an EPC, and/or between two eNBs connecting to the EPC. In embodiments where the wireless communication system 100 is an NR system (e.g., when CN 124 is a 5GC), the interface 122 may be an Xn interface. The Xn interface is defined between two or more base stations (e.g., two or more gNBs and the like) that connect to 5GC, between a base station 112 (e.g., a gNB) connecting to 5GC and an eNB, and/or between two eNBs connecting to 5GC (e.g., CN 124).

The RAN 106 is shown to be communicatively coupled to the CN 124. The CN 124 may comprise one or more network elements 126, which are configured to offer various data and telecommunications services to customers/subscribers (e.g., users of UE 102 and UE 104) who are connected to the CN 124 via the RAN 106. The components of the CN 124 may be implemented in one physical device or separate physical devices including components to read and execute instructions from a machine-readable or computer-readable medium (e.g., a non-transitory machine-readable storage medium).

In embodiments, the CN 124 may be an EPC, and the RAN 106 may be connected with the CN 124 via an S1 interface 128. In embodiments, the S1 interface 128 may be split into two parts, an S1 user plane (S1-U) interface, which carries traffic data between the base station 112 or base station 114 and a serving gateway (S-GW), and the S1-MME interface, which is a signaling interface between the base station 112 or base station 114 and mobility management entities (MMEs).

In embodiments, the CN 124 may be a 5GC, and the RAN 106 may be connected with the CN 124 via an NG interface 128. In embodiments, the NG interface 128 may be split into two parts, an NG user plane (NG-U) interface, which carries traffic data between the base station 112 or base station 114 and a user plane function (UPF), and the S1 control plane (NG-C) interface, which is a signaling interface between the base station 112 or base station 114 and access and mobility management functions (AMFs).

Generally, an application server 130 may be an element offering applications that use internet protocol (IP) bearer resources with the CN 124 (e.g., packet switched data services). The application server 130 can also be configured to support one or more communication services (e.g., VoIP sessions, group communication sessions, etc.) for the UE 102 and UE 104 via the CN 124. The application server 130 may communicate with the CN 124 through an IP communications interface 132.

Figure 2:
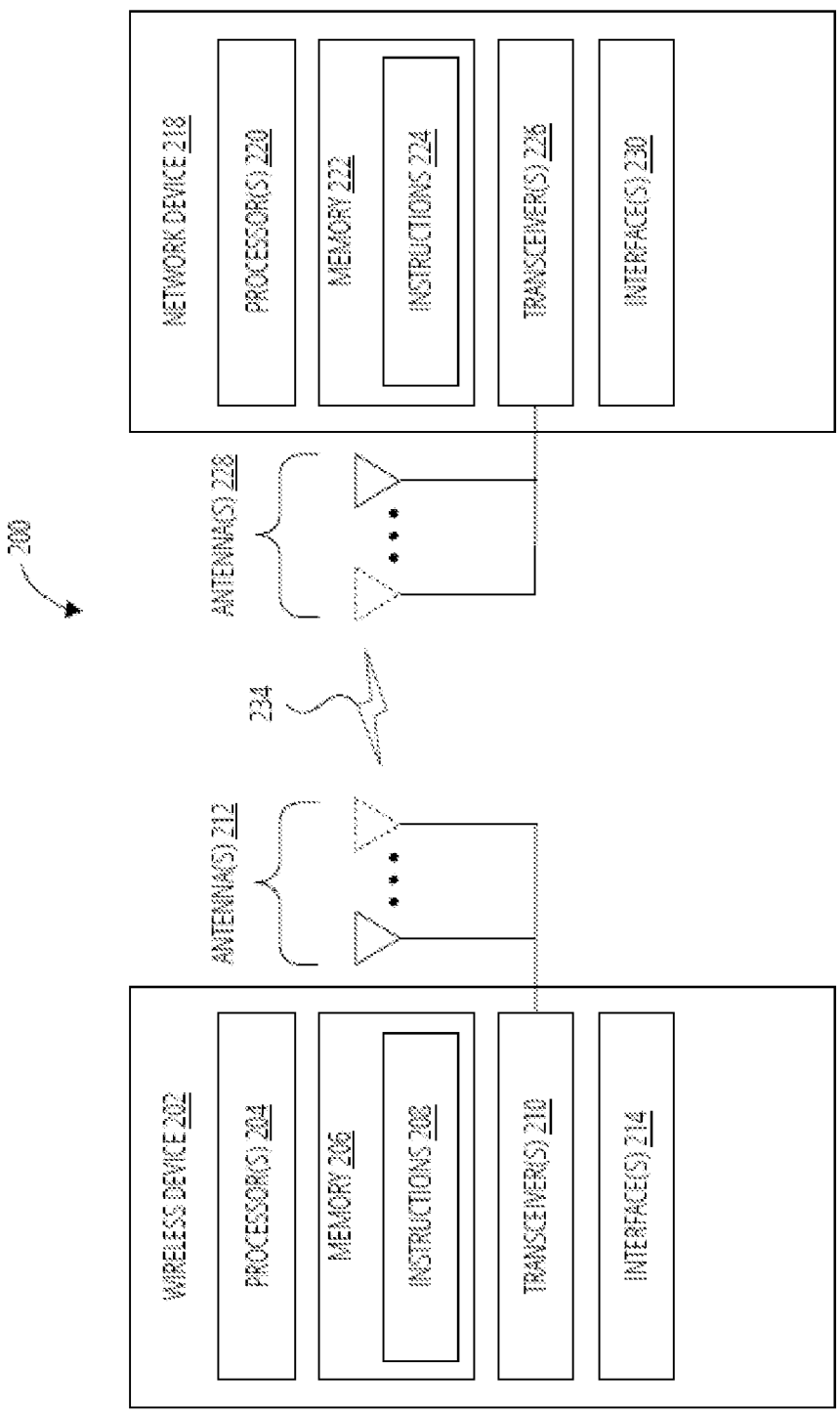
FIG. 2 illustrates a system for performing signaling between a wireless device and a network device, according to embodiments disclosed herein.

FIG. 2 illustrates a system 200 for performing signaling 234 between a wireless device 202 and a network device 218, according to embodiments disclosed herein. The system 200 may be a portion of a wireless communications system as herein described. The wireless device 202 may be, for example, a UE of a wireless communication system. The network device 218 may be, for example, a base station (e.g., an eNB or a gNB) of a wireless communication system.

The wireless device 202 may include one or more processor(s) 204. The processor(s) 204 may execute instructions such that various operations of the wireless device 202 are performed, as described herein. The processor(s) 204 may include one or more baseband processors implemented using, for example, a central processing unit (CPU), a digital signal processor (DSP), an application specific integrated circuit (ASIC), a controller, a field programmable gate array (FPGA) device, another hardware device, a firmware device, or any combination thereof configured to perform the operations described herein.

The wireless device 202 may include a memory 206. The memory 206 may be a non-transitory computer-readable storage medium that stores instructions 208 (which may include, for example, the instructions being executed by the processor(s) 204). The instructions 208 may also be referred to as program code or a computer program. The memory 206 may also store data used by, and results computed by, the processor(s) 204.

The wireless device 202 may include one or more transceiver(s) 210 that may include radio frequency (RF) transmitter and/or receiver circuitry that use the antenna(s) 212 of the wireless device 202 to facilitate signaling (e.g., the signaling 234) to and/or from the wireless device 202 with other devices (e.g., the network device 218) according to corresponding RATs.

The wireless device 202 may include one or more antenna(s) 212 (e.g., one, two, four, or more). For embodiments with multiple antenna(s) 212, the wireless device 202 may leverage the spatial diversity of such multiple antenna(s) 212 to send and/or receive multiple different data streams on the same time and frequency resources. This behavior may be referred to as, for example, multiple input multiple output (MIMO) behavior (referring to the multiple antennas used at each of a transmitting device and a receiving device that enable this aspect). MIMO transmissions by the wireless device 202 may be accomplished according to precoding (or digital beamforming) that is applied at the wireless device 202 that multiplexes the data streams across the antenna(s) 212 according to known or assumed channel characteristics such that each data stream is received with an appropriate signal strength relative to other streams and at a desired location in the spatial domain (e.g., the location of a receiver associated with that data stream). Certain embodiments may use single user MIMO (SU-MIMO) methods (where the data streams are all directed to a single receiver) and/or multi user MIMO (MU-MIMO) methods (where individual data streams may be directed to individual (different) receivers in different locations in the spatial domain).

In certain embodiments having multiple antennas, the wireless device 202 may implement analog beamforming techniques, whereby phases of the signals sent by the antenna(s) 212 are relatively adjusted such that the (joint) transmission of the antenna(s) 212 can be directed (this is sometimes referred to as beam steering).

The wireless device 202 may include one or more interface(s) 214. The interface(s) 214 may be used to provide input to or output from the wireless device 202. For example, a wireless device 202 that is a UE may include interface(s) 214 such as microphones, speakers, a touchscreen, buttons, and the like in order to allow for input and/or output to the UE by a user of the UE. Other interfaces of such a UE may be made up of transmitters, receivers, and other circuitry (e.g., other than the transceiver(s) 210/antenna(s) 212 already described) that allow for communication between the UE and other devices and may operate according to known protocols (e.g., Wi-Fi®, Bluetooth®, and the like).

The network device 218 may include one or more processor(s) 220. The processor(s) 220 may execute instructions such that various operations of the network device 218 are performed, as described herein. The processor(s) 204 may include one or more baseband processors implemented using, for example, a CPU, a DSP, an ASIC, a controller, an FPGA device, another hardware device, a firmware device, or any combination thereof configured to perform the operations described herein.

The network device 218 may include a memory 222. The memory 222 may be a non-transitory computer-readable storage medium that stores instructions 224 (which may include, for example, the instructions being executed by the processor(s) 220). The instructions 224 may also be referred to as program code or a computer program. The memory 222 may also store data used by, and results computed by, the processor(s) 220.

The network device 218 may include one or more transceiver(s) 226 that may include RF transmitter and/or receiver circuitry that use the antenna(s) 228 of the network device 218 to facilitate signaling (e.g., the signaling 234) to and/or from the network device 218 with other devices (e.g., the wireless device 202) according to corresponding RATs.

The network device 218 may include one or more antenna(s) 228 (e.g., one, two, four, or more). In embodiments having multiple antenna(s) 228, the network device 218 may perform MIMO, digital beamforming, analog beamforming, beam steering, etc., as has been described.

The network device 218 may include one or more interface(s) 230. The interface(s) 230 may be used to provide input to or output from the network device 218. For example, a network device 218 that is a base station may include interface(s) 230 made up of transmitters, receivers, and other circuitry (e.g., other than the transceiver(s) 226/antenna(s) 228 already described) that enables the base station to communicate with other equipment in a core network, and/or that enables the base station to communicate with external networks, computers, databases, and the like for purposes of operations, administration, and maintenance of the base station or other equipment operably connected thereto.

Measurements and Simultaneous RX Beams Capability

Figure 3:
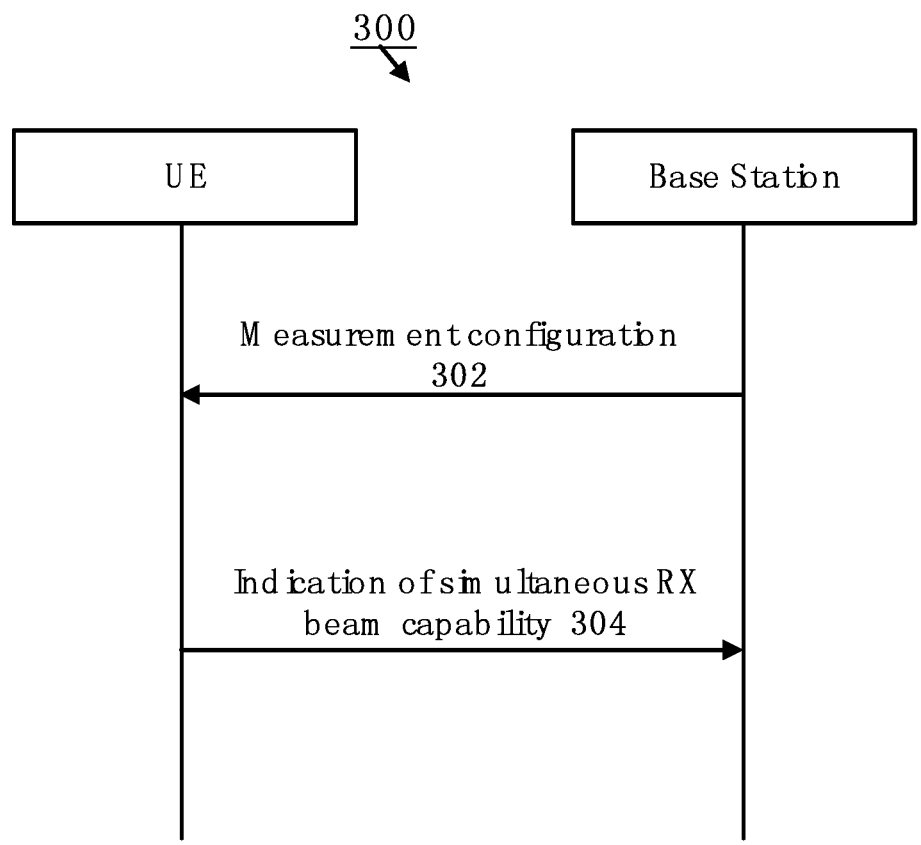
FIG. 3 illustrates a flow diagram of an example method for communication between a UE and a base station, according to embodiments disclosed herein.

FIG. 3 illustrates a flow diagram of an example method 300 for communication between a UE and a base station, according to embodiments disclosed herein. The example method 300 can be performed by the UE and the base station as shown in or described in relation to FIGS. 1 and 2.

As shown by FIG. 3, at 302, the base station can transmit a measurement configuration to the UE. In general, the measurement configuration can include a measurement period for performing measurements on one or more carriers. Measurements can be performed during each measurement occasion within the measurement period. An example of time period for measurements will be presented below. The measurement occasion and the measurement period can be of length of several milliseconds (ms).

As shown by FIG. 3, at 304, the UE can transmit, to the base station, an indication of a simultaneous RX beams capability. For example, the UE can transmit the indication via Radio Resource Control (RRC) signaling to the base station. In some embodiments, the simultaneous RX beams capability indicates whether the UE can support multiple RX beams for L3 or L1 measurements on a single carrier, and a beam number of the multiple RX beams supported by the UE. In some embodiments, the capability indicates whether the UE can support multiple RX beams for L3 and L1 measurements together on a single carrier, and a beam number of the multiple RX beams supported by the UE. In descriptions herein, the term "band" can be used interchangeably with the term "carrier", and has the full breadth of its ordinary meaning, at least including a section of spectrum (e.g., radio frequency spectrum) in which channels are used or set aside for the same purpose.

In some embodiments, it is indicated whether the UE can support multiple RX beams for measurements on the single carrier by a first capability, or Capability 1. With Capability 1 being supported, the UE can support simultaneous RX beams for the measurements on the single carrier or band. In embodiments disclosed herein, "simultaneous RX beams" or similar expression means the multiple RX beams occur in a same time occasion or window (e.g., a measurement occasion).

In some embodiments, when the beam number of the multiple RX beams supported by the UE is explicitly indicated by a second capability, or Capability 2. Alternatively, instead of explicit indication, the beam number of the multiple RX beams can be specified and hardcoded in the 3GPP or similar standards or used as an agreed assumption when the above Capability 1 is supported by the UE.

With the multiple RX beams occurring on the single carrier in the same time occasion, the UE can obtain more snapshots (samples) for radio resource management (RRM) L3 and/or L1 measurements within a measurement occasion, which means it is possible to complete the measurements within a shorter measurement period. In embodiments disclosed herein, as a first example, one or more L3 measurements can be performed on one or more simultaneous RX beams on the single carrier or band. As a second example, one or more L1 measurements can be performed on one or more simultaneous RX beams on the single carrier or band. As a third example, one or more L3 and L1 measurements can be performed on one or more simultaneous RX beams on the single carrier or band. In particular, the UE can perform L3 measurements and L1 measurements separately by using different beams of the multiple RX beams, for example, rough RX beams for the L3 measurements, and fine RX beams for the L1 measurements.

Capability 1 can be configured by a parameter "simultaneousReceptionDiffTypeD-forL3", "simultaneousReceptionDiffTypeDforL1", or "simultaneousReceptionDiffTypeDfor-L1andL3" in the 3GPP standards depending on the simultaneous RX beams are used for L3 or L1 or L3 plus L1 measurements. This parameter can be set to a positive or negative value, for example. Capability 2 can be configured by a parameter "numOfSimultaneousReceptionDiff-TypeDforL3", "numOfSimultaneousReceptionDiffTypeDforL1", and "numOfSimultaneous-ReceptionDiffTypeDforL1andL3", which can be set as a natural number.

Indication of Simultaneous RX Beams Capability

In some embodiments, the above Capability 1 and/or Capability 2 can be indicated on a per UE basis, which means the capability parameter is at the level of UE. In some embodiments, the above Capability 1 and/or Capability 2 can be indicated on a per band basis, which means the capability parameter is at the level of band or carrier. In some embodiments, the above Capability 1 and/or Capability 2 can be indicated on a per band combination (BC) basis, which means the capability parameter is at the level of BC. In some embodiments, the above Capability 1 and/or Capability 2 can be indicated on a per band per BC basis, which means the capability parameter is at the level of band within the BC.

For Capability 1, if indicated on a per UE basis, a positive value may indicate the UE can support simultaneous RX beams for measurements on each of its carriers, including e.g. a PCC and SCCs; a negative value may indicate the UE can support simultaneous RX beams for measurements on none of its carriers. If indicated on a per band basis, a positive value may indicate the UE can support simultaneous RX beams for measurements on the specific band and corresponding carrier, e.g. a PCC or a SCC; a negative value may indicate the UE cannot support simultaneous RX beams for measurements on that band. If indicated on a per BC basis, a positive value may indicate the UE can support simultaneous RX beams for measurements on each of carriers within the BC, including e.g. a PCC and SCCs; a negative value may indicate the UE cannot support simultaneous RX beams for measurements on carriers within that BC. If indicated on a per band per BC basis, a positive value may indicate the UE can support simultaneous RX beams for measurements on the specific band or carrier within the BC, e.g. a PCC or a SCC; a negative value may indicate the UE cannot support simultaneous RX beams for measurements on that band or carrier within the BC.

For Capability 2, the following Table 1 illustrates examples of indication on a per UE or per band basis. Note that Capability 2 is considered only when the indication of Capability 1 is positive. For example, when indicated on a per UE basis, Capability 2 can indicate the number of simultaneous RX beams supported by the whole UE, or by all bands of the UE. Accordingly, when setting Capability 2 on a per UE basis, the physical resources related to antenna panels at the UE will be considered. The physical resources can be a constraint for Capability 2. As shown by Table 1, the per UE manner indicates the UE can support 8 (i.e., the beam number) simultaneous RX beams in total. In embodiments disclosed herein, each of the bands (namely B1 to B4) or corresponding carriers can be assigned with 8 RX beams, or has to share 8 RX beams, which will be described in detail below.

When indicated on a per band basis, Capability 2 can indicate the number of simultaneous RX beams supported by the UE on each separate band. As shown by Table 1, the per band manner indicates the number of simultaneous RX beams the UE can support on each band or corresponding carrier. In embodiments disclosed herein, each of bands B1 to B4 or corresponding carriers can support 2 RX beams, although it is not always the case where the beam numbers for all the bands are equal.

TABLE 1

Example Indication of Capacity 2

|  | UE | B1 | B2 | B3 | B4 |
|---|---|---|---|---|---|
| per UE | 8 | | | | |
| per band | | 2 | 2 | 2 | 2 |

For Capability 2, the following Table 2 illustrates examples of indication on a per BC or per band per BC basis. Again, Capability 2 is considered only when the indication of Capability 1 is positive. When indicated on a per BC basis, Capability 2 can indicate the number of simultaneous RX beams supported by the UE on the BC, or on bands within the BC. The per BC manner is similar to the per UE manner in that both manners indicate the beam number for a group of bands. As shown by Table 2, the per BC manner indicates the beam number for the BC, composed of B1, B3, and B4, is 6. In embodiments disclosed herein, each of the bands (namely B1, B3, and B4) or corresponding carriers can be assigned with 6 RX beams, or has to share 6 RX beams, which will be described in detail below.

When indicated on a per band per BC basis, Capability 2 can indicate the number of simultaneous RX beams supported by the UE on one or more separate bands within a BC. As shown by Table 2, the per band per BC manner indicates the number of simultaneous RX beams the UE can support on each band or corresponding carrier within the BC composed of B1, B3, and B4. In embodiments disclosed herein, each of bands B1, B3 and B4 or corresponding carriers can support 3, 1, or 2 RX beams, although the beam numbers for the three bands can be equal in some cases.

TABLE 2

Example Indication of Capacity 2

|  | BC (band group) | B1 | B2 | B3 | B4 |
|---|---|---|---|---|---|
| per BC | 6 | | | | |
| per band per BC | | 3 | | 1 | 2 |

When inter-band FR2 CA or inter-band FR2 DC is enabled for the UE, the UE is configured with at least one primary component carrier (PCC) or primary secondary component carrier (PSCC), and N secondary component carriers (SCCs), wherein N≥1. In embodiments disclosed herein, the simultaneous RX beams capability for a single carrier can be used for improving and enhancing measurement procedures on these multiple carriers.

Use of Capability for Inter-Band FR2 CA or DC L3 Measurement

In the following, it will be described the use of the simultaneous RX beams capability for inter-band FR2 CA or inter-band FR2 CA DC L3 measurement first. The embodiments may be described mainly with reference to the inter-band FR2 CA scenario. Those skilled in the art can understand that the described elements or operations can be equally applied to the inter-band FR2 DC scenario. In embodiments disclosed herein, situations where the UE can support simultaneous RX beams on one carrier or band will be considered, and the measurement procedures on one or more carriers will be configured or adapted accordingly.

Figure 4:
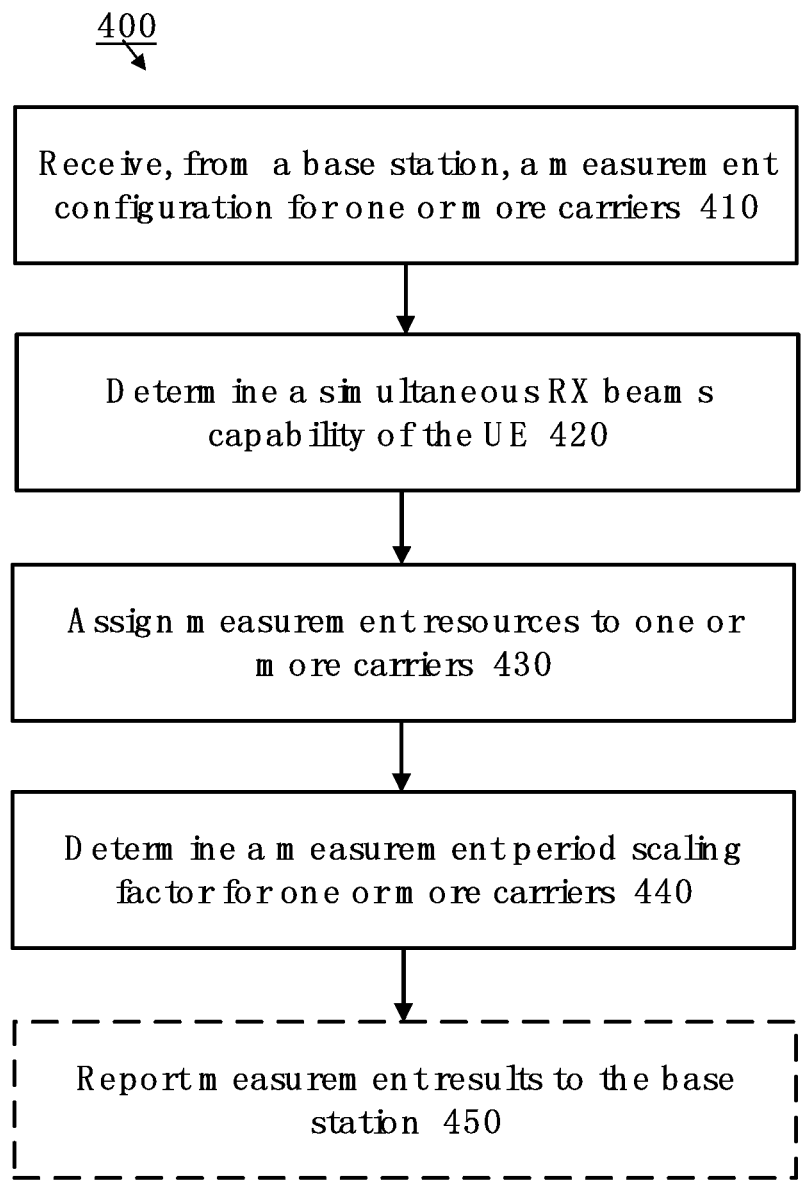
FIG. 4 illustrates a flow diagram of an example method for L3 and/or L1 measurements in the inter-band FR2 CA or inter-band FR2 DC scenario based on the simultaneous RX beams capability, according to embodiments disclosed herein.

FIG. 4 illustrates a flow diagram of an example method 400 for L3 and/or L1 measurements in the inter-band FR2 CA or inter-band FR2 DC scenario based on the simultaneous RX beams capability, according to embodiments disclosed herein. The example method 400 shown in FIG. 4 can be performed by a UE (or component thereof such as a processor) in communication with a base station as shown in or described in relation to FIGS. 1 and 2. Although FIG. 4 shows blocks in a particular order, this order is merely exemplary and the operations shown in FIG. 4 can be performed in a different order than shown in, and can be combined and/or divided into blocks having different functionality. Optional operations are indicated by dashed lines.

In some embodiments, the method 400 is used with 13 measurements when inter-band FR2 CA or inter-band FR2 DC is configured to the UE. In such cases, the UE can be configured with one or more carriers including at least one primary component carrier (PCC) or primary secondary component carrier (PSCC) and N secondary component carriers (SCCs), where N≥1. In either case of inter-band FR2 CA or inter-band FR2 DC, it is necessary to coordinate measurement resources on parallel carriers, including at least one PCC or PSCC, and one or more SCCs. As shown by FIG. 4, at 410, the UE can receive, from a base station, a measurement configuration including a measurement period for performing measurements on one or more carriers. In embodiments disclosed herein, the L3 measurements can include SSB based L3 measurement, and/or CSI-RS based L3 measurement, for example.

As shown by FIG. 4, at 420, the UE can determine a simultaneous RX beams capability of the UE. The simultaneous RX beams capability indicates whether the UE can support multiple RX beams for L3 measurements on a single carrier, and a beam number of the multiple RX beams supported by the UE. By supporting multiple RX beams for L3 measurements on a single carrier, the UE can obtain more snapshots (samples) for L3 measurements within a measurement occasion, which means the measurements can be completed in a shorter measurement period. As described above, the simultaneous RX beams capability can be determined on a per UE basis, a per band basis, a per BC basis, or a per band per BC basis, depending on how the capability is indicated.

As shown by FIG. 4, at 430, based on the determined simultaneous RX beams capability, the UE can coordinate measurement resources among one or more carriers by assigning the resources to the carriers. In embodiments disclosed herein, the measurement resources include searchers and RX beams during each measurement occasion. The measurement resource coordination can specify how the searchers and the RX beams are assigned among the carriers. Various examples of measurement resources coordination or assignment will be described further below.

As shown by FIG. 4, at 440, based on the assigned resources to one or more carriers, the UE can determine a measurement period scaling factor, and optionally a scaled measurement period for one or more carriers. By supporting multiple RX beams for L3 measurements on a single carrier, the measurement period for the carrier can be shortened by the measurement period scaling factor. In this aspect, it is advantageous for the UE to complete the L3 measurement and report to the base station earlier. In this way, decisions on RRM, mobility control, for example, handover, can be made earlier before the serving carrier becomes unusable.

As shown by FIG. 4, at 450, the UE can report the measurement results based on the scaled measurement period to the base station.

Figure 5:
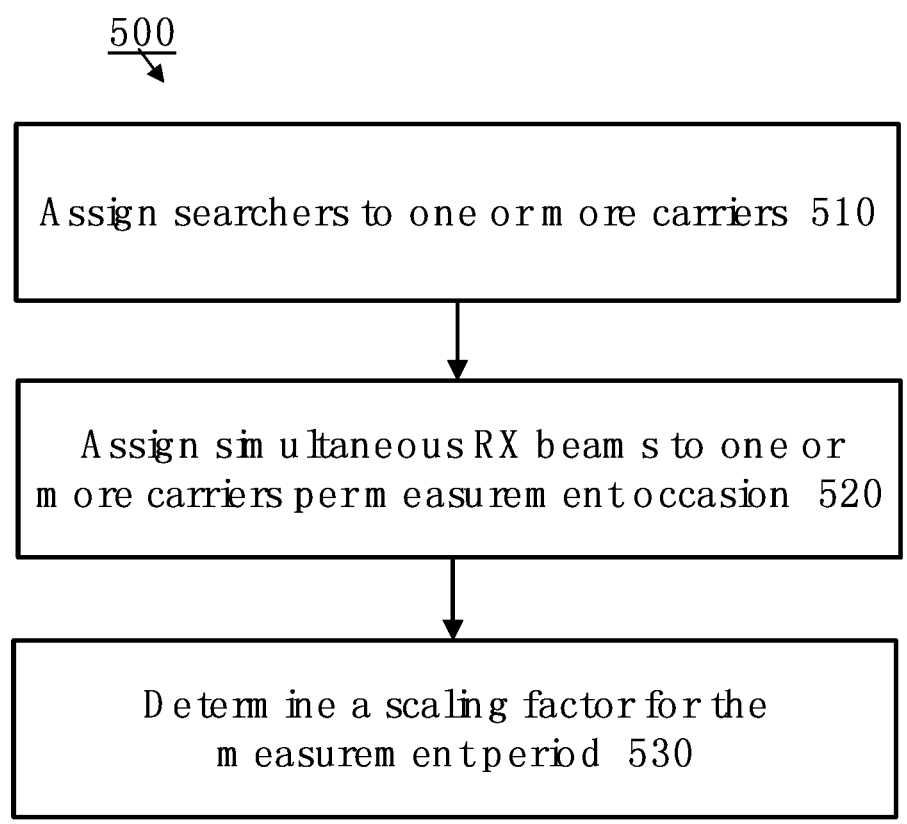
FIG. 5 illustrates a flow diagram of an example method for coordinating measurement resources based on the simultaneous RX beams capability, according to embodiments disclosed herein.

FIG. 5 illustrates a flow diagram of an example method 500 for coordinating measurement resources based on the simultaneous RX beams capability, according to embodiments disclosed herein. The example method 500 shown in FIG. 5 can be performed by a UE (or component thereof such as a processor) in communication with a base station as shown in or described in relation to FIGS. 1 and 2. Although FIG. 5 shows blocks in a particular order, this order is merely exemplary and the operations shown in FIG. 5 can be performed in a different order than shown in, and can be combined and/or divided into blocks having different functionality.

In embodiments disclosed herein, the method 500 can be used for coordinating L3 measurement resources, or for coordinating L1 measurement resources, among multiple carriers. As described above, measurement resources can include searchers and simultaneous RX beams. For measurements at different layers, the measurement resources may be different. For example, L3 measurements may be related to rough RX beams, and L1 measurements may be related to fine RX beams. For another example, the searcher limitation for the L3 and L1 measurements can be different. Searchers for L3 measurements may be related to a first amount of memory for storing samples or results during L3 measurements, and the first amount of memory may limit how many carriers a UE can measure in parallel at layer 3. Similarly, searchers for L1 measurements may be related to a second amount of memory for storing samples or results during L1 measurements, and the second amount of memory may limit how many carriers a UE can measure in parallel at layer 1.

As shown by FIG. 5, at 510, the UE can assign searchers to one or more carriers. For example, there can be K searchers, where K≥2. The one or more carriers include one PCC or PSCC, and N SCCs, where N≥1. In the examples herein, description on a PCC can be equally applied to a PSCC, unless stated otherwise; vice versa. In an example, the K searchers are used for L3 measurements on the (N+1) carriers. In some embodiment, the K searchers can be assigned to these carriers according to any proportions. That is, a same or different proportion of the K searchers can be assigned to each carrier during each measurement occasion. In some embodiments, the PCC or PSCC is prioritized in the searcher assignment considering measurements on the PCC or PSCC is more important than on the SCC. For example, for the whole measurement period, a dedicated searcher can be assigned to the PCC or PSCC, and the (K−1) searchers can be shared by the N SCCs. Similarly, a same or different proportion of the (K−1) searchers can be assigned to each of the N carriers during each measurement occasion. After the searcher assignment, there can be K carriers to be measured during each measurement occasion.

Table 3 shows an example of searcher assignment for L3 measurements. In the example, there are 2 searchers for L3 measurements on 1 PCC and 2 SCCs. To prioritize the measurements on the PCC, a first searcher is assigned to the PCC for the measurement period, including measurement occasions 1 to 8, as indicated by "Y" in Table 3. A second searcher is equally shared by the SCC 1 and SCC 2. As can be seen in Table 3, the second searcher is assigned to the SCC 1 or SCC 2 in an alternating manner.

TABLE 3

Example of Searcher Assignment

| | Measurement Occasion 1 | Measurement Occasion 2 | Measurement Occasion 3 | Measurement Occasion 4 | Measurement Occasion 5 | Measurement Occasion 6 | Measurement Occasion 7 | Measurement Occasion 8 |
|---|---|---|---|---|---|---|---|---|
| PCC | Y | Y | Y | Y | Y | Y | Y | Y |
| SCC 1 | Y | | Y | | Y | | Y | |
| SCC 2 | | Y | | Y | | Y | | Y |

As shown by FIG. 5, at 520, the UE can assign simultaneous RX beams to one or more carriers per measurement occasion based on the simultaneous RX beams capability. For a measurement occasion, the UE can determine one or more carriers to be measured, for example, based on results of the searcher assignment, and the UE can assign one or more simultaneous RX beams to each carrier to be measured.

Table 4 shows an example of carrier assignment for L3 measurements, for the carriers to be measured as determined in Table 3. In the example, based on the simultaneous RX beams capability, 2 RX beams are assigned to the PCC, and 2 RX beams are assigned to SCC 1 or SCC 2 to be measured during each of measurement occasion 1 to 8, as shown in Table 4.

TABLE 4

Example of Carrier Assignment

| | Measurement Occasion 1 | Measurement Occasion 2 | Measurement Occasion 3 | Measurement Occasion 4 | Measurement Occasion 5 | Measurement Occasion 6 | Measurement Occasion 7 | Measurement Occasion 8 |
|---|---|---|---|---|---|---|---|---|
| PCC | 2 | 2 | 2 | 2 | 2 | 2 | 2 | 2 |
| SCC 1 | 2 | | 2 | | 2 | | 2 | |
| SCC 2 | | 2 | | 2 | | 2 | | 2 |

As shown by FIG. 5, at 530, the UE can determine a scaling factor for the measurement period based on the searchers and the number of simultaneous RX beams assigned. Note that measurements on a specific number of beams can be completed within a shorter time period by measuring multiple beams simultaneously than by measuring just one beam at a time. As can be seen in Table 4, measurements of 8 RX beams on the PCC can be completed within measurement occasion 1 to 4 by measuring 2 RX beams during each measurement occasion. Compared to conventional manner of measuring 1 RX beam per measurement occasion, the measurement period can be shortened by a scaling factor ½. As can be seen in Table 4, measurements of 8 RX beams on the SCC 1 or SCC 2 can be completed within measurement occasion 1 to 8 by measuring 2 RX beams during each measurement occasion. Compared to conventional manner of measuring 1 RX beam per measurement occasion, the measurement period can be shortened by a scaling factor 2×(½). "2" in the factor is due to sharing of one searcher between the two SCCs.

Examples of RX Beam Assignment

As described above, the simultaneous RX beams capability can be indicated on different bases. It is important to determine the beam number (or Capability 2) in view of the capability indication manner.

Moreover, there are different ways to assign simultaneous RX beams to the carriers to be measured during each measurement occasion. In some embodiments, a same number of beams can be assigned to parallel carriers. In some embodiments, beams assigned to parallel carriers may be of different numbers. For example, when inter-band FR2 CA or inter-band FR2 DC within FR2 is configured to UE, a beam management type can be independent beam management (IBM) or common beam management (CBM). When a UE indicates to support IBM on two CCs of CA, the UE would have two RX beams for those two CCs respectively. In the following examples, a same number of beams can be assigned to parallel carriers for CBM, and a same of different numbers of beams can be assigned to parallel carriers for IBM.

In some embodiments where CBM is supported as a beam management type, assigning the measurement resources includes, for each measurement occasion, based on Capability 1 being supported and the beam number M, where M≥2, determining M RX beams to be assigned to each carrier to be measured during this measurement occasion. In an example, the beam number M (i.e., Capability 2) can be indicated in any manner, i.e., on a per UE basis, a per band basis, a per BC basis, or a per band per BC basis. M beams are assigned to each carrier to be measured during this measurement occasion.

An example of RX beam assignment for a beam management type of CBM can be seen in FIG. 6A. A simultaneous RX beam number is indicated by Capability 2 as M=2. In this example, for the measurement period, the measurement period scaling factor for the PCC is determined as 1/M, and the measurement period scaling factor for each SCC as N/(M×(K−1)). In particular, for FIG. 6A, the scaling factor for the PCC is ½, and the sealing factor for each SCC is N/(M×(K−1)=2/(2×(2−1)=1.

FIG. 6B illustrates another example of RX beam assignment for a beam management type of CBM. In this example, after a round of measurements for RX beams 1 to 8, both searchers are assigned to the two SCCs for the following two measurement occasions, such that the measurements of the SCCs can be completed earlier.

In some embodiments where IBM is supported as a beam management type, assigning the measurement resources includes, for each measurement occasion, based on Capability 1 being supported and the beam number M as indicated on a per UE basis or per BC basis, where M≥2, determining M/2 RX beams to be assigned to the PCC and equally sharing the other M/2 RX beams among the (K−1) SCCs to be measured during this measurement occasion. When the beam number M (i.e., Capability 2) is indicated on a per UE basis, the RX beams can be shared among all carriers of the UE. When indicated on a per BC basis, the RX beams can be shared among all carriers within the BC.

An example of RX beam assignment for a beam management type of IBM can be seen in FIG. 7A. A simultaneous RX beam number is indicated on a per UE basis by Capability 2 as M=4. In this example, for the measurement period, the measurement period scaling factor for the PCC is determined as 2/M, and the measurement period scaling factor for each SCC is determined as 2N/(M×(K−1)). In particular, for FIG. 7A, the scaling factor for the PCC is 2/M=½, and the scaling factor for each SCC is 2N/(M×(K−1))=2×2/(4×(2−1))=1.

In an embodiment, more RX beams can be assigned to the PCC first, such that measurements on the PCC can be completed earlier. FIG. 7B illustrate another example of RX beam assignment for a beam management type of IBM. In this example, for the first two measurement occasions, all the M=4 RX beams are allocated to the PCC. After a round of measurements for RX beams 1 to 8, both searchers are assigned to the two SCCs for the following four measurement occasions. This pattern can continue.

In some embodiments where IBM is supported as a beam management type, for each measurement occasion and based on Capability 1 being supported and the beam number M' as indicated on a per band basis or per band per BC basis (where M'≥2), assigning the measurement resources includes, if M≥M'×K, determining M' RX beams to be assigned to each carrier to be measured during this measurement occasion, and for the measurement period, determining the measurement period scaling factor for the PCC as 1/M', and the measurement period scaling factor for each SCC as N/(M'×(K−1)); or if M<M'×K, determining M/2 RX beams to be assigned to PCC and sharing the other M/2 RX beams among the (K−1) SCCs to be measured during this measurement occasion, and for the measurement period, determining the measurement period scaling factor for the PCC as 2/M, and the measurement period scaling factor for each SCC as 2N/(M×(K−1)).

An example of RX beam assignment for a beam management type of IBM can be seen in FIG. 8A, where a simultaneous RX beam number is indicated on a per band (or per band per BC) basis as M'=2, a simultaneous RX beam number is indicated on a per UE (or per BC) basis as M=4. Accordingly, there is M=M'×K (i.e., 4=2×2). This means RX beam assignment based on the beam number for the band can be within the constraint set by the beam number for the whole UE. Accordingly, the RX beam assignment will be based on M'.

Another example of RX beam assignment for a beam management type of IBM can be seen in FIG. 8B, where a simultaneous RX beam number is indicated on a per band (or per band per BC) basis as M'=4, a simultaneous RX beam number is indicated on a per UE (or per BC) basis as M=6. Accordingly, there is M<M'×K (i.e., 6<4×2). This means RX beam assignment based on the beam number for the band may go beyond the constraint set by the beam number for the whole UE. Accordingly, the RX beam assignment will be based on M.

Use of Capability for Inter-Band FR2 CA or DC L1 Measurement

In the following, it will be described the use of the simultaneous RX beams capability for inter-band FR2 CA or inter-band FR2 CA DC L1 measurement.

In some embodiments, if the simultaneous RX beams capability is supported by the UE, one or more L1 measurements can be performed on one or more simultaneous RX beams on the single carrier or band. Note that the objects, features, advantages in relation to "Use of Capability for Inter-band FR2 CA or DC L3 Measurement" described above can be similarly applied here to L1 measurements. In embodiments disclosed herein, L1 measurements can include at least one of SSB based beamform detection (BFD). SSB based candidate beam detection (CBD), SSB based L1-RSRP, SSB based radio link monitoring (RLM), CSI-RS based BFD, CSI-RS based CBD, CSI-RS based L1-RSRP, CSI-RS based RLM, to name a few.

Embodiments for L1 measurements can be understood with reference to FIGS. 4 to 8B and corresponding descriptions, with configurations and parameters for L3 measurements replaced with those for L1 measurements. For example, there can be separate measurement configurations and different RX beams (for example, fine beams) for L1 measurements. These embodiments are not described here in detail.

Use of Capability for Inter-Band FR2 CA or DC L3 and L1 Measurements

In embodiments disclosed herein, the simultaneous RX beams capability can further indicate whether the UE supports multiple RX beams for L3 and L1 measurements together on a single carrier and a beam number of the multiple RX beams supported by the UE. For the L3 and L1 measurements, the UE can assign measurement resources for the measurements together on this carrier. In this example, the measurement resources include time domain resources (for example, measurement occasions) and RX beams.

In some embodiments, the UE can perform L1 measurement in parallel with L3 measurement on each time occasion on the carrier. That is, the time occasion can be assigned to parallel L3 and L1 measurements, and only assignment of the simultaneous RX beams becomes necessary in this case. In such embodiment, assigning the measurement resources on the single carrier can include sharing measurement occasions between the L3 and L1 measurements in a time division multiplexing manner, and for each measurement occasion, assigning the multiple RX beams to either the L3 or L1 measurement. For example, if M RX beams are supported, a first subset of the RX beams can be assigned for L3 measurements, and a second subset of the RX beams can be assigned for L1 measurements. To make full use of the capability, all other RX beams than the first subset can be assigned for L1 measurements on the carrier. In some embodiments, the base station can signal a sharing factor k % to the UE indicating k %×M RX beams will be used for L3 measurements and (1−k %)×M RX beams will be used for L1 measurements. Alternatively, this parameter can be specified and hardcoded in, e.g., the 3GPP specification. For example, the value of k % can be ½ or ⅔. An example of such assignment of measurement resources can be seen in FIG. 9A, where M=3, and k %=⅔.

In some embodiments, the UE can perform L1 measurement and L3 measurement on different time occasions on the carrier. That is, a time occasion or a measurement occasion can be assigned to a L3 measurement or a L1 measurement, and only assignment of the time domain resources becomes necessary in this case. On each time occasion, either the L3 measurement or L1 measurement would use the M simultaneous RX beams. In such embodiment, assigning the measurement resources on the single carrier can include, for each measurement occasion, sharing the multiple RX beams between the L3 and L1 measurements. For example, the base station can signal a parameter x % to the UE indicating x % of the time domain resources will be used for L3 measurements and (1−x %) of the time domain resources will be used for L1 measurements. Alternatively, this parameter can be hardcoded in, e.g., the 3GPP specification. An example of such assignment of measurement resources can be seen in FIG. 9B, where M=3, and x %=⅔.

Embodiments contemplated herein include an apparatus comprising means to perform one or more elements of any of method 300, 400, and 500. This apparatus may be, for example, an apparatus of a UE (such as a wireless device 202 that is a UE, as described herein).

Embodiments contemplated herein include one or more non-transitory computer-readable media comprising instructions to cause an electronic device, upon execution of the instructions by one or more processors of the electronic device, to perform one or more elements of any of method 300, 400, and 500. This non-transitory computer-readable media may be, for example, a memory of a UE (such as a memory 206 of a wireless device 202 that is a UE, as described herein).

Embodiments contemplated herein include an apparatus comprising logic, modules, or circuitry to perform one or more elements of any of method 300, 400, and 500. This apparatus may be, for example, an apparatus of a UE (such as a wireless device 202 that is a UE, as described herein).

Embodiments contemplated herein include an apparatus comprising: one or more processors and one or more computer-readable media comprising instructions that, when executed by the one or more processors, cause the one or more processors to perform one or more elements of any of method 300, 400, and 500. This apparatus may be, for example, an apparatus of a UE (such as a wireless device 202 that is a UE, as described herein).

Embodiments contemplated herein include a signal as described in or related to one or more elements of the method any of method 300, 400, and 500.

Embodiments contemplated herein include a computer program or computer program product comprising instructions, wherein execution of the program by a processor is to cause the processor to carry out one or more elements of any of method 300, 400, and 500. The processor may be a processor of a UE (such as a processor(s) 204 of a wireless device 202 that is a UE, as described herein). These instructions may be, for example, located in the processor and/or on a memory of the UE (such as a memory 206 of a wireless device 202 that is a UE, as described herein).

In the present disclosure, the definition and the indication of the simultaneous RX beams capability is described in detail. With the capability enabled, a UE can complete L1 and/or L3 measurements on a single carrier within a shorter time period. According to embodiments disclosed herein, if inter-band FR2 CA or inter-band FR2 DC is configured to the UE, the UE can coordinate measurement resources among multiple serving carriers or across different layers. By use of this capability, the UE can complete L1 and/or L3 measurements and transmit measurement reports to the base station earlier. In this way, for example, decisions on RRM, mobility control (e.g., handover) can be made earlier before the serving carrier becomes unusable.

For one or more embodiments, at least one of the components set forth in one or more of the preceding figures may be configured to perform one or more operations, techniques, processes, and/or methods as set forth herein. For example, a baseband processor as described herein in connection with one or more of the preceding figures may be configured to operate in accordance with one or more of the examples set forth herein. For another example, circuitry associated with a UE, base station, network element, etc. as described above in connection with one or more of the preceding figures may be configured to operate in accordance with one or more of the examples set forth herein.

Any of the above described embodiments may be combined with any other embodiment (or combination of embodiments), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A user equipment device (UE), comprising:
one or more antennas configured to perform wireless communications;
a transceiver coupled to the one or more antennas; and
a processor coupled to the transceiver and configured to cause the UE to:
for layer 3 (L3) or layer 1 (L1) measurements:
receive, from a base station, a measurement configuration comprising a measurement period for performing measurements on one or more carriers;
determine a simultaneous receiving (RX) beams capability of the UE, wherein the simultaneous RX beams capability indicates whether the UE supports multiple RX beams for L3 or L1 measurements on a single carrier and a beam number of the multiple RX beams supported by the UE;
based on the simultaneous RX beams capability, assign measurement resources to the one or more carriers based on a searcher limitation corresponding to a number of the one or more carriers the UE can measure in parallel and the beam number of the multiple RX beams during each measurement occasion; and
based on the assigned resources, determine a measurement period scaling factor to shorten the measured period for the one or more carriers.

2. The UE of claim 1, wherein the one or more carriers comprise at least one primary component carrier (PCC) or primary secondary component carrier (PSCC) and N secondary component carriers (SCCs), when inter-band FR2 carrier aggregation (CA) or inter-band FR2 dual connectivity (DC) is configured to the UE, and wherein N≥1.

3. The UE of claim 2, wherein
it is indicated whether the UE supports multiple RX beams for measurements on the single carrier by a first capability, and
the beam number is indicated by a second capability or is hardcoded in standards.

4. The UE of claim 3, wherein the first capability and/or the second capability are indicated at least:
on a per UE basis,
on a per band basis,
on a per band combination (BC) basis, or
on a per band per BC basis.

5. The UE of claim 4, wherein, for the searcher limitation of K carriers, where K≥2, assigning the measurement resources comprises assigning one RX beam of the multiple RX beams to the PCC or PSCC, and sharing other (K−1) RX beams of the multiple RX beams among the N SCCs, thereby obtaining the K carriers to be measured during each measurement occasion.

6. The UE of claim 5, wherein, if common beam management (CBM) is supported as a beam management type, assigning the measurement resources comprises:
for each measurement occasion, based on the first capability being supported and the beam number M as indicated on any basis, where M≥2, determining M RX beams to be assigned to each carrier to be measured during this measurement occasion; and
for the measurement period, determining the measurement period scaling factor for the PCC or PSCC as 1/M, and the measurement period scaling factor for each SCC as N/(M×(K−1)).

7. The UE of claim 5, wherein, if independent beam management (IBM) is supported as a beam management type, assigning the measurement resources comprises:

for each measurement occasion, based on the first capability being supported and the beam number M as indicated on a per UE basis or per BC basis, where M≥2, determining M/2 RX beams to be assigned to PCC or PSCC and sharing the other M/2 RX beams among the (K−1) SCCs to be measured during this measurement occasion; and for the measurement period, determining the measurement period scaling factor for the PCC or PSCC as 2/M, and the measurement period scaling factor for each SCC as 2N/(M×(K−1)).

8. The UE of claim 7, wherein assigning the measurement resources further comprises:

for each measurement occasion, based on the first capability being supported and the beam number M' as indicated on a per band basis or per band per BC basis, where M'≥2, if M≥M'×K, determining M' RX beams to be assigned to each carrier to be measured during this measurement occasion, and for the measurement period, determining the measurement period scaling factor for the PCC or PSCC as 1/M', and the measurement period scaling factor for each SCC as N/(M'×(K−1)); or if M<M'×K, determining M/2 RX beams to be assigned to PCC or PSCC and sharing the other M/2 RX beams among the (K−1) SCCs to be measured during this measurement occasion, and for the measurement period, determining the measurement period scaling factor for the PCC or PSCC as 2/M, and the measurement period scaling factor for each SCC as 2N/(M×(K−1)).

9. The UE of claim 1, wherein
the simultaneous RX beams capability further indicates whether the UE supports multiple RX beams for L3 and L1 measurements together on a single carrier and a beam number of the multiple RX beams supported by the UE, and for L3 and L1 measurements, the processor is further configured to cause the UE to assign measurement resources on the single carrier, wherein the measurement resources comprise measurement occasions and RX beams.

10. The UE of claim 9, wherein assigning the measurement resources on the single carrier comprises:

sharing the measurement occasions between the L3 and L1 measurements in a time division multiplexing manner, and for each measurement occasion, assigning the multiple RX beams to either the L3 or L1 measurement; or for each measurement occasion, sharing the multiple RX beams between the L3 and L1 measurements.

11. A method for operating a user equipment device (UE), the method comprising:

for layer 3 (L3) or layer 1 (L1) measurements:
receiving, from a base station, a measurement configuration comprising a measurement period for performing measurements on one or more carriers;
determining a simultaneous receiving (RX) beams capability of the UE, wherein the simultaneous RX beams capability indicates whether the UE supports multiple RX beams for L3 or L1 measurements on a single carrier and a beam number of the multiple RX beams supported by the UE;

based on the simultaneous RX beams capability, assigning measurement resources to the one or more carriers based on a searcher limitation corresponding to a number of the one or more carriers the UE can measure in parallel, and the beam number of the multiple RX beams during each measurement occasion; and based on the assigned resources, determining a measurement period scaling factor to shorten the measured period for the one or more carriers.

12. The method of claim 11, wherein the one or more carriers comprise at least one primary component carrier (PCC) or primary secondary component carrier (PSCC) and N secondary component carriers (SCCs), when inter-band FR2 carrier aggregation (CA) or inter-band FR2 dual connectivity (DC) is configured to the UE, and wherein N≥1.

13. The method of claim 12, wherein
it is indicated whether the UE supports multiple RX beams for measurements on the single carrier by a first capability, and
the beam number is indicated by a second capability or is hardcoded in standards.

14. The method of claim 11, wherein
the simultaneous RX beams capability further indicates whether the UE supports multiple RX beams for L3 and L1 measurements on a single carrier and a beam number of the multiple RX beams supported by the UE, and for L3 and L1 measurements, the method further comprising assigning measurement resources on the single carrier, wherein the measurement resources comprise measurement occasions and RX beams.

15. The method of claim 14, wherein assigning the measurement resources on the single carrier comprises:

sharing the measurement occasions between the L3 and L1 measurements in a time division multiplexing manner, and for each measurement occasion, assigning the multiple RX beams to either the L3 or L1 measurement; or for each measurement occasion, sharing the multiple RX beams between the L3 and L1 measurements.

16. The method of claim 13, wherein the first capability and/or the second capability are indicated at least:
on a per UE basis,
on a per band basis,
on a per band combination (BC) basis, or
on a per band per BC basis.

17. The method of claim 16, wherein, for the searcher limitation of K carriers, where K≥2, assigning the measurement resources comprises assigning one RX beam of the multiple RX beams to the PCC or PSCC, and sharing other (K−1) RX beams of the multiple RX beams among the N SCCs, thereby obtaining the K carriers to be measured during each measurement occasion.

18. The method of claim 17, wherein, if common beam management (CBM) is supported as a beam management type, assigning the measurement resources comprises:

for each measurement occasion, based on a positive value of the first capability and the beam number M as indicated on any basis, where M≥2, determining M RX beams to be assigned to each carrier to be measured during this measurement occasion; and for the measurement period, determining the measurement period scaling factor for the PCC or PSCC as 1/M, and the measurement period scaling factor for each SCC as N/(M×(K−1)).

19. The method of claim 17, wherein, if independent beam management (IBM) is supported as a beam management type, assigning the measurement resources comprises:
  for each measurement occasion, based on a positive value of the first capability and the beam number M as indicated on a per UE basis or per BC basis, where M≥2, determining M/2 RX beams to be assigned to PCC or PSCC and sharing the other M/2 RX beams among the (K−1) SCCs to be measured during this measurement occasion; and
  for the measurement period, determining the measurement period scaling factor for the PCC or PSCC as 2/M, and the measurement period scaling factor for each SCC as 2N/(M×(K−1)).

20. The method of claim 19, wherein assigning the measurement resources further comprises:
  for each measurement occasion, based on a positive value of the first capability and the beam number M' as indicated on a per band basis or per band per BC basis, where M'≥2,
  if M≥M'×K, determining M' RX beams to be assigned to each carrier to be measured during this measurement occasion, and for the measurement period, determining the measurement period scaling factor for the PCC or PSCC as 1/M', and the measurement period scaling factor for each SCC as N/(M'×(K−1)); or
  if M<M'×K, determining M/2 RX beams to be assigned to PCC or PSCC and sharing the other M/2 RX beams among the (K−1) SCCs to be measured during this measurement occasion, and for the measurement period, determining the measurement period scaling factor for the PCC or PSCC as 2/M, and the measurement period scaling factor for each SCC as 2N/(M×(K−1)).

* * * * *